3,598,772
MINERAL FILLED POLYURETHANE FOAMS

Bruce G. Hood, Marblehead, and Robert A. Gardella, Swampscott, Mass., assignor to Hood Foam Industries, Inc., Marblehead, Mass.

No Drawing. Continuation-in-part of application Ser. No. 702,513, Feb. 2, 1968, which is a continuation-in-part of application Ser. No. 550,893, May 18, 1966, which in turn is a continuation-in-part of application Ser. No. 335,356, Jan. 2, 1964. This application Jan. 28, 1969, Ser. No. 794,787

Int. Cl. C08g 22/44, 51/04

U.S. Cl. 260—2.5                              5 Claims

ABSTRACT OF THE DISCLOSURE

Polyurethane foams derived from polyesters or polyethers have uniformly dispersed therein from 75 to 200% of an inert mineral filler on the weight of the polyurethane, including zirconium silicate and silica. The fillers have densities between 2 and 5.5 grams per cubic centimeter and particles which vary in average size from 120 to 400 microns in diameter and are substantially spherical in shape, and are admixed with the polyurethane-forming material prior to the foaming reaction. The polyurethane-forming material includes a long chain polyol, an organic polyisocyanate, and water in an amount between 3 and 4.5 percent by weight of the polyol used.

---

This application is a continuation-in-part of application Ser. No. 702,513, filed Feb. 2, 1968, now abandoned, which is a continuation-in-part of application Ser. No. 550,893, filed May 18, 1966, now abandoned, which is a continuation-in-part of application Ser. No. 335,356, filed Jan. 2, 1964, now abandoned.

The present invention relates to cellular polyurethane materials of the type suitable for cushioning, and to methods of preparing such materials. More particularly the invention relates to the preparation of improved flexible polyurethane foam products such as those prepared by reacting polyalkylene ether glycols with polyisocyanates in the presence of a certain hereinafter specified amount of water.

At present polyurethane foams of the type referred to above are light in weight, as compared with the more common rubber latex foams, and do not have the body and handling qualities of such foams. While it would be possible to obtain polyurethane foams of the desired weight and handling characteristics by increasing the quantity of the polyurethane reaction materials employed, in such case the cost of manufacture would be excessive, and in fact prohibitive in a competitive market. Efforts have also previously been made to increase the density of polyurethane foam by adding certain quantities of very finely divided mineral fillers. However, it was only possible to add relatively small amounts of such filler, up to 10 percent, or at most about 25 percent based on the weight of the foam reactants, without spoiling or weakening the texture of the foam, or without markedly lowering the tensile and tear strengths and otherwise changing the characteristics of the resultant foam material.

It is accordingly a primary object of the present invention to provide a flexible polyurethane foam having substantially the high density and good handling characteristics of rubber latex foam, while at the same time retaining the other good properties of conventional low density polyurethane foam, such as elongation and tensile strength and also the load bearing characteristics required in the manufacture of suitable cushioning materials.

It is a further object of the invention to improve the seating qualities in general of flexible polyurethane foams, without losing the other desirable properties such foams have.

It is a further object to obtain a foam product of the qualities above outlined which can be made at substantially the same cost as conventional low density polyurethane foam, which normally has a density of about 1 to 2 pounds per cubic foot.

Further objects and advantages of the invention can be readily ascertained from the following description and appended claims.

The invention is, in general, carried out by adding to the foam-forming ingredients prior to their interaction relatively large quantities by weight of hereinafter specified inert mineral filler material having certain characteristics, but particularly being of relatively large particle size and high density and having substantially spherical shaped particles. By using particles of this nature, it is possible to increase the weight or density of the ultimate foam product to the desired extent without interfering appreciably with the foam-forming reaction, owing to the fact that the larger, substantially spherical shaped particles herein contemplated have much less surface area per unit of weight than the fine mineral particles or the flat flaky fillers used in the prior art.

According to this invention it has been found that if an amount of filler between 75 and 200 percent by weight, based on the weight of the foam-forming reactants, is added thereto prior to reaction taking place, a cellular mass is obtained which has the weight and feel of a piece of rubber latex foam of the same volume and is just as suitable in other respects for cushioning material as polyurethane foam of similar formulation, but in which the filler has been omitted. Preferably the filler is added in an amount sufficient to increase the weight from 2 to 2½ times the original weight per unit volume. For example, excellent results are obtained if the weight of the filled product is twice the weight without the filler, that is, by incorporating an amount of filler equal to about 100% of the weight of the original reactants.

In previous attempts to produce a suitable high density material for cushions by the addition of fillers, if more than 10%, or in any case 25% of filler on the weight of the reactants were added, the mixture became too thick and the reaction failed to proceed to completion or resulted in products of poor tensile and tear strength. This can be readily understood when it is considered that finely divided fillers present an enormously greater total surface as compared with relatively coarse fillers. The total surface area found in the finely divided fillers of the prior art is so great that it actually interferes extensively with the normal reaction of the foam-forming materials when admixed therewith and results in weak and otherwise defective cushioning, if large amounts are employed.

In accordance with this invention it has been found that if a filler of suitably high density and of sufficiently large particle size is employed in the manufacture of the foam, the desired weight characteristics in the end product can be obtained without appreciable loss of strength, resilience and other properties normally required in foam cushioning material. Certain inert mineral filler materials having densities between about 2 and 5.5 grams per cubic centimeter, or higher, are entirely suitable. In order to be effective for the purposes of this invention the fillers should either have or be capable or being made into particle sizes averaging between 120 and 400 microns in diameter. Thus the individual particles in any particular batch of filler may vary somewhat, but should average not less than 120 microns nor more than 400 microns in diameter.

It will be apparent from the above that if two different fillers have about the same average particle size, the one with the higher density will be more effective because fewer particles need be present and therefore less surface area will be exposed to the liquid reaction mixture. Thus, in selecting between two different minerals, assuming the cost factor and availability is substantially the same, the filler material having the higher density would normally be utilized, provided also the average particle size were in the desired range or could be readily ground or otherwise made into the proper size. We have found, for example, that silica sand, including ordinary beach sand, ground quartz and zircon sand can be used to advantage as fillers for the purposes of this invention. However, the zircon sand is preferred as between these materials, because it has a density of 4.5, while ground quartz and beach sand each have a density of only 2.5. Thus, if an equal weight of each material is used in two separate batches of the polyurethane-forming mixture and the particles in each case average about the same size, almost twice the total volume and twice the number of particles of the beach sand or the ground quartz will be required as compared with the zircon sand, and in view of this the surface area presented by the beach sand will be almost twice as great as that presented by the zircon sand. Nevertheless, beach sand of essentially the average particle size found on the seashore is highly suitable, as it can be added to polyurethane foam reactants in sufficient quantities to produce a product of the weight characteristics of rubber latex foam (which in general has a density of between 3 and 4 pounds per cubic foot) without appreciably changing the other properties of the urethane foam and without appreciably adding to the cost as compared with a similar untreated foam.

Of the filler materias hereinbefore named, the zircon sand averages from about 130 to 150 microns in diameter, while ordinary beach sand is apt to vary from an average of about 150 to an average of about 400 microns in diameter. Still larger average particles may be used for the purposes of this invention, but if the size is too large, for example above about 800 microns, the surfaces of the cushion material may become somewhat harsh or rough feeling and therefore less desirable for ordinary use.

Examples of very useful minerals for the purposes of this invention include the following:

Filler:          Density (in grams per cubic centimeter)

$SiO_2$ ------------------------------- 2.5
$ZrSiO_4$ ------------------------------ 4.5

Zircon sand ($ZrSiO_4$) and silica sand are most suitable because the particles are relatively uniform in size, spherical in shape and have relatively smooth and rounded surfaces. Both of these materials are readily available and low in price. Ground quartz is also suitable, if ground to the average size range hereinbefore referred to.

The polyurethane foams in which the above fillers are employed are those obtained by foaming the reaction product of a polyisocyanate and a long chain substantially linear polyhydroxyl compound in the presence of a catalyst. The long chain polyol used is one that normally in the absence of filler reacts with the polyisocyanate to produce an essentially linear reaction product which, in the presence of a catalyst, is capable of being foamed to provide an open celled low density polyurethane product. A preferred class of polyols for the purposes of this invention are the polyalkylene ether polyols, commonly referred to as polyethers, which are the reaction products of alkylene diamines, such as ethylene diamine, or polyhydroxy compounds such as glycerine or trimethylol propane, with alkylene ethers such as ethylene oxides, propylene oxides, or mixtures thereof. Such polyethers have a functionality of at least 2.

Another class of suitable polyhydroxyl compounds that may be used is that of saturated polyesters having terminal hydroxyl groups and low acid numbers. Such polyesters are made from a dibasic acid, such as adipic acid or succinic acid, and a dihydric alcohol, such as ethylene glycol or propylene glycol. Still other polyols may be used instead of those referred to above, provided that they are normally capable of forming an open celled foam with the polyisocyanate.

A variety of polyisocyanates may be reacted with the polyols to prepare the cellular urethane products of the invention. It is preferable, however, to use aromatic polyisocyanates, since they are more reactive and less toxic than aliphatic polyisocyanates. Typical readily available isocyanates include 2,4-tolylene diisocyanate, 2,6-tolylene diisocyanate and mixtures thereof. However, other diisocyanates may be used, such as methylene bis (4-phenyl isocyanate), naphthalene 1,5-diisocyanate, and a 3,3'-dimethoxy-4,4'-biphenylene diisocyanate. The isocyanate is usually employed in excess of that required to react with all functional groups in the polyol, and also to react completely with the water used in the manufacture of polyurethane foams. The amount of water used is that customarily used commercially in making polyurethane foams, which is between 3 and 4.5 parts by weight for each 100 parts of polyol.

Various other materials in addition to the filler may be incorporated with the foam compositions of our invention, including plasticizers such as di-esters, which impart flexibility, coloring materials, emulsifiers and surface active agents. Moreover, any of the known methods for preparing conventional low density open celled polyurethane cellular plastics may be employed in preparing the filler-extended high density foams of this invention, including the "prepolymer" method, the so-called "one shot" method, and the like.

A further understanding of the invention will be obtained from the following detailed description and examples of various reaction mixtures and filler materials capable of producing the improved polyurethane foam compositions contemplated herein.

A series of comparative tests were made to determine the physical properties of certain polyurethane foam compositions containing different kinds and amounts of fillers suitable for the purposes of this invention. For conducting these tests the following compositions were first prepared using the materials and the proportions given, the amounts shown being parts by weight. The compositions which contain filler are exemplary of the kind of improved polyurethane foams which can be prepared in accordance with this invention.

EXAMPLES

|  | A | B | C | D | E | F | G | H |
|---|---|---|---|---|---|---|---|---|
| Triol (3,000 mol. wt.) | 75.0 | 75.0 | 75.0 | 50.0 | 50.0 | 100.0 | 100.0 | 100.0 |
| Diol (2,000 mol. wt.) | 25.0 | 25.0 | 25.0 | 50.0 | 50.0 | 0 | 0 | 0 |
| Trichloromonofluoromethane | 13.0 | 13.0 | 13.0 | 20.0 | 20.0 | 15.0 | 15.0 | 10.0 |
| Tolylene diisocyanate | 54.0 | 54.0 | 54.0 | 48.0 | 48.0 | 44.6 | 44.6 | 44.6 |
| Silicone | 2.0 | 2.0 | 2.0 | 2.0 | 2.0 | 2.0 | 2.0 | 2.0 |
| Stannous octoate | 0.26 | 0.26 | 0.26 | 0.24 | 0.24 | 0.2 | 0.2 | 0.2 |
| Triethylene diamine | 0.26 | 0.26 | 0.26 | 0.24 | 0.24 | 0.2 | 0.2 | 0.2 |
| Water | 4.5 | 4.5 | 4.5 | 4.0 | 4.0 | 3.5 | 3.5 | 3.5 |
| Filler | 0 | 174.0 (1) | 174.0 (2) | 0 | 174.0 (2) | 0 | 206.0 (1) | 174.0 (3) |

[1] Silica sand.
[2] Zircon sand.
[3] Ground quartz.

The triol used in the above examples was a trihydroxyl polyol, also known as polyoxypropylene triol, which is the polymeric reaction product of propylene oxide and glycerin, which contains three active hydrogens. The active hydrogen compound initiates the oxide polymerization, which is continued unitl the desired molecular weight of the triol is reached.

The diol used was a dihydroxy polyglycol made in a manner similar to the above procedure, but which is the polymeric reaction product of ethylene oxide and ethylene glycol, which contains two active hydrogens.

The trichloromonofluoro methane employed is a relatively inert material used as an auxiliary blowing agent.

The tolylene diisocyanate used consists of 80% 2,4- and 20% 2,6-tolylene diisocyanate. It serves as a reactant with the polyglycols and water to promote polymer growth, evolution of $CO_2$ and cross linking.

The silicone was an alkyl silicone-polyoxyalkylene copolymer obtained from the Silicones Division of Union Carbide Corporation under the trademark "L-520." It is employed as a surfactant to impart stability to the cells during foaming.

The stannous octoate and the triethylene diamine both serve as catalysts.

The zircon sand used in the above examples is a zirconium silicate in the form of sand obtained from Australia and having an average particle size of 130 microns. The ground quartz had an average particle size of 185 microns. The silica sand used was No. 7020 silica sand having an average particle size of 165 microns obtained from the Wedron Silica Company of Chicago, Ill.

The various foam-forming mixtures described above were reacted in the following manner to produce flexible foam compositions.

The water, triethylene diamine and silicone surfactant were first blended to form a homogeneous solution, which is subsequently referred to as the catalyst solution. The stannous octoate was then blended with a portion of either or both of the polyglycols in an amount sufficient to make a 1 to 5% solution of stannous octoate, which will be referred to as the "tin masterbatch."

The filler material, when used, was preblended with the remainder of the polyglycols to make a so-called "filler masterbatch." The polyglycols, either alone or in the form of the filler masterbatch, the trichloromonofluoro methane, the diisocyanate, the catalyst solution and the tin masterbatch were all then simultaneously metered by pumps, in the proportions set forth in the examples, to a conventional mixing head for polyurethane foam of the type commonly known as a "Newton basket," wherein the materials were blended to a homogeneous mixture and deposited into a mold.

The resultant mixture then began to expand and polymerize in the mold. After maximum expansion had occurred, the entire mold and its contents of foamed material were heated to between approximately 220° and 250° F. and maintained at such temperatures for about 15 to 20 minutes. The foamed material was then removed from the mold and allowed to cure at room temperature for approximately twenty-four hours.

After being prepared in the manner described above, the various foam compositions were subjected to certain physical tests with the following results.

The tests resulting in the above data were performed in accordance with the methods prepared jointly by the

PHYSICAL PROPERTIES

| | A | B | C | D | E | F | G | H |
|---|---|---|---|---|---|---|---|---|
| Density, lbs./ft.³ | 1.6 | 3.5 | 3.6 | 1.5 | 3.5 | 1.9 | 4.0 | 3.9 |
| Tensile, p.s.i | 16.2 | 14.1 | 15.1 | 14.2 | 12.9 | 15.0 | 14.1 | 14.3 |
| Elongation, percent | 210 | 165 | 170 | 330 | 300 | 220 | 195 | 210 |
| Tear, lb./in | 2.1 | 1.7 | 1.8 | 2.8 | 2.6 | 2.2 | 2.0 | 2.1 |
| Compression set, percent | 8.2 | 9.2 | 10.3 | 13.2 | 14.1 | 9.5 | 10.5 | 9.0 |
| 25% load deflection, lbs | 21.0 | 26.2 | 25.7 | 17.1 | 18.5 | 20.0 | 25.0 | 22.5 |
| 65% load deflection, lbs | 51.5 | 81.0 | 77.0 | 41.2 | 56.5 | 50.0 | 77.5 | 67.4 |
| SAC factor (65%/25%) | 2.45 | 3.1 | 3.0 | 2.41 | 3.05 | 2.5 | 3.1 | 3.0 |
| Fatigue, percent loss in 25% load deflection | 24 | 26 | 25 | 28 | 27 | 21 | 22 | 22 |

American Society for Testing Materials and the Society of the Plastics Industry and described in "Tentative Methods of Test for Flexible Urethane Foam," A.S.T.M. Designation: D1564-63T. The various methods for the tests referred to above can be found in the following sections of this book.

| | |
|---|---|
| Density | Suffix tests, suffix W, sections 68 to 73. |
| Tensile | Suffix tests, suffix T, sections 81 to 87. |
| Elongation | |
| Tear | Suffix tests, suffix G, sections 74 to 80. |
| Compression set | Basic tests, method B, sections 13 to 19. |
| 25% load deflection | |
| 65% load deflection | Basic tests, method A, sections 20 to 25. |
| SAC factor | |
| Fatigue | Suffix tests, suffix H, sections 45 to 67. Procedure A. |

The above physical test data indicate that the foam compositions containing inert mineral fillers with particles within the size ranges described herein have tensile, elongation and tear properties substantially the same as those compositions not containing any filler. Specifically, Examples B and C are the same as Example A, except that Examples B and C contain 100% of silica sand and zircon sand, respectively, based on the weight of the materials used in Example A. In spite of this filled content, however, the tensile, elongation and tear strength of compositions B and C were only slightly reduced as compared with composition A.

It will also be noted that the 25% load deflection values of Examples B and C increased only slightly as compared with Example A, while the 65% load deflection values increased substantially, resulting in much higher SAC factors, an important criterion in good cushion seating. Moreover, an inspection of the density values for Example A, B and C shows that the density increase in Examples B and C was almost completely due to the presence of the low cost filler, which indicates that improved products of substantially the same or only slightly increased cost can be obtained by means of the invention.

A comparison of Examples D and E, where Example E is substantially the same as Example D, except that it includes the addition of 100% by weight of filler based on the total weight of composition D, shows the same comparative results as outlined above with respect to Examples A, B and C. Examples F, G and H, in which Example F represents the control, show that similar results are obtained by incorporating in the polyurethane foam 125% by weight of silica sand and about 100% by weight of ground quartz, respectively, in which each has an average particle size within the range described herein. Thus, the tests show in general that the incorporation in the foam compositions of relatively large quantities of fillers of the type described herein results in high density urethane products having substantially the weight and feel of rubber latex foam, while retaining the good tensile, elongation and tear strength characteristics of conventional low density urethane foams. Moreover, these advantageous results are obtained at substantially the same costs, on a volume basis, as compared with the usual low density systems, due to the fact that most of the increase in density derives from the low cost fillers employed.

What we claim is:

1. A flexible polyurethane foam composition suitable for cushioning and having a density between about 3 and 4 pounds per cubic foot comprising a flexible, low-density polyurethane having a density between about 1 and 2 pounds per cubic foot and having uniformly dispersed therein from 75 to 200 weight percent, based on the weight of said low density polyurethane, of an inert filler selected from the group consisting of $SiO_2$, and $ZrSiO_4$, said filler having a density between 2 and 5.5 grams per cubic centimeter and an average particles diameter between 120 and 400 microns.

2. The polyurethane foam substantially as described in claim 1, but further characterized in that the amount of said filler varies from 100 to 150 percent by weight, on the weight of said low-density polyurethane, and the average particle diameter is between about 130 and 185 microns.

3. The polyurethane foam substantially as described in claim 1, but further characterized in that said inert mineral filler is $SiO_2$.

4. The polyurethane foam substantially as described in claim 1, but further characterized in that said inert mineral filler is $ZrSiO_4$.

5. The polyurethane foam substantially described in claim 1, but further characterized in that said filler has an average particle size between 130 and 400 microns and is dispersed therein in amounts from 100 to 200 weight percent on the weight of polyurethane.

References Cited

UNITED STATES PATENTS

| | | | |
|---|---|---|---|
| 3,015,634 | 1/1962 | Ferrigno | 260—2.5 |
| 3,021,290 | 2/1962 | Gmitter et al. | 260—2.5 |
| 3,052,927 | 9/1962 | Hoppe et al. | 18—59 |
| 3,054,756 | 9/1962 | Holtschmidt et al. | 260—2.5 |
| 3,125,540 | 3/1964 | Loew et al. | 260—2.5 |
| 3,136,732 | 6/1964 | Kaestner et al. | 260—33.6 |
| 3,298,976 | 1/1967 | Reinhart | 260—2.5 |
| 3,441,523 | 4/1969 | Dwyer et al. | 260—2.5 |
| 3,029,209 | 4/1962 | Ferrigno. | |

FOREIGN PATENTS

| | | | |
|---|---|---|---|
| 653,554 | | Canada. | |
| 801,070 | 9/1958 | Great Britain | 260—2.5 |
| 1,093,173 | 11/1967 | Great Britain | 260—2.5 |
| 788,062 | | Great Britain. | |
| 796,044 | | Great Britain. | |

OTHER REFERENCES

Kunstoffe, vol. 42, December 1952, pages 450–459.
SPE Journal; vol. 16, June 1960, pages 638–640.

DONALD E. CZAJA, Primary Examiner

C. W. IVY, Assistant Examiner